United States Patent
Kawamura (10) Patent No.: US 6,437,531 B1
(45) Date of Patent: Aug. 20, 2002

(54) BACKUP METHOD OF MICROCOMPUTER USED IN CASE OF STOPPAGE OF OPERATION, BACKUP UNIT OF MICROCOMPUTER, AND CONTROL UNIT FOR CONTROLLING POWER WINDOW FOR AUTOMOBILE USE

(75) Inventor: Yoshihiro Kawamura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/605,734

(22) Filed: Jun. 29, 2000

(30) Foreign Application Priority Data

Jun. 30, 1999 (JP) .......................................... 11-186161

(51) Int. Cl.[7] .............................................. H02P 7/00
(52) U.S. Cl. ..................... 318/445; 318/447; 318/560; 318/562; 318/565; 318/569; 701/29; 701/35; 701/102; 701/114; 701/209; 701/211; 711/162; 711/204; 711/161
(58) Field of Search ................... 318/560–569, 318/440–447; 364/187, 431.11, 551, 424.02, 256.3; 180/168, 169; 395/575, 182.08, 182.11; 365/229, 226; 711/162, 204, 161; 701/29, 35, 102, 114, 1, 209, 211

(56) References Cited

U.S. PATENT DOCUMENTS

| | | | |
|---|---|---|---|
| 4,351,023 A | * | 9/1982 | Richter |
| 4,748,566 A | * | 5/1988 | Sasaki et al. |
| 4,956,777 A | * | 9/1990 | Cearly et al. |
| 5,044,697 A | * | 9/1991 | Longyear et al. |
| 5,089,958 A | * | 2/1992 | Horton et al. |
| 5,195,040 A | * | 3/1993 | Goldsmith |
| 5,488,716 A | * | 1/1996 | Schneider et al. |
| 5,519,663 A | * | 5/1996 | Harper, Jr. et al. |
| 5,621,885 A | * | 4/1997 | Del Vigna, Jr. |
| 6,081,875 A | * | 6/2000 | Clifton et al. |
| 6,108,598 A | * | 8/2000 | Sumitani |
| 6,230,082 B1 | * | 5/2001 | Harada et al. |

FOREIGN PATENT DOCUMENTS

| | | | |
|---|---|---|---|
| JP | 62-166161 | * | 7/1987 |
| JP | 11-146572 | * | 5/1999 |
| JP | 11-342736 | * | 12/1999 |
| JP | 2000-188892 | * | 7/2000 |
| JP | 2000-188895 | * | 7/2000 |

* cited by examiner

Primary Examiner—Robert E. Nappi
Assistant Examiner—Rita Leykin
(74) Attorney, Agent, or Firm—Sughrue Mion, PLLC (57) ABSTRACT

There is provided an external watchdog timer 30 for detecting a temporary runaway of the microcomputer body 20 and resetting it according to a pulse output of the microcomputer body 20. Further, an internal watchdog timer 70 operated independently from a control section of CPU of the microcomputer body 20 is incorporated as a program. When a pulse signal is not outputted from the microcomputer body 20 exceeding a predetermined period of time, the external watchdog timer 30 is disabled, and impedance of the output terminal 32 is made high and the backup circuit 60 is set in an operating condition, so that the windowpane can be opened and closed by a manual operation switch 11.

14 Claims, 4 Drawing Sheets

BACKUP METHOD OF MICROCOMPUTER USED IN CASE OF STOPPAGE OF OPERATION, BACKUP UNIT OF MICROCOMPUTER, AND CONTROL UNIT FOR CONTROLLING POWER WINDOW FOR AUTOMOBILE USE

BACKGROUND OF THE INVENTION

1. Technical Field

The present invention relates to a backup method of a microcomputer used in the case of stoppage of operation, a backup unit of the microcomputer, and a control unit for controlling a power window for automobile use.

2. Related Art

Recently, electronic control conducted by microcomputers has come into wide use in the field of general industrial equipment. Especially, electronic control has made remarkable progress for controlling automobiles synthetically and for controlling mobile communication devices. On the other hand, the microcomputer is disadvantageous in that it is affected by electromagnetic waves and further it tends to be damaged when it is covered with water according to rain or flood.

For example, a power window device for automatically opening and closing a windshield glass of an automobile door (hereinafter, such a windshield glass is referred to as "a windowpane" in this specification) by a motor is not an exception. When a failure is caused in the microcomputer in the above circumstances, various unpredictable problems may be caused.

Therefore, the following techniques have been proposed, by which the microcomputer is backed up in the power window device so that the safety of operation can be ensured in the case of failure of the microcomputer.

A backup device of the conventional power window device is operated as follows. When operation of the microcomputer is stopped because it is covered with water or some problems caused in the microcomputer, operation of a watchdog timer is stopped and impedance of the reset output of the watchdog timer is made high. Due to the foregoing, the microcomputer is stopped from being reset.

The reason why impedance of the reset output of the watchdog timer is made high when the microcomputer is covered with water or some problems caused in the microcomputer is described below.

Unless the reset of the microcomputer is stopped when the microcomputer is covered with water or some problems caused in the microcomputer, the reset output of the watchdog timer periodically repeats High/Low. Therefore, it can not be used as a condition of driving the backup circuit by which the windowpane can be manually pulled up and down.

Only when the reset output of the watchdog timer is at a low level, that is, only when the microcomputer is reset, the backup circuit can pull up and down the windowpane by manual operation. Therefore, when the reset output periodically repeats High/Low, it is impossible to pull up and down the windowpane in the practical use.

In this connection, the above conventional backup device has the following problems to be solved. The problems are described below.

Even when the microcomputer runs away temporarily which is not a case in which the microcomputer is covered with water or the microcomputer is out of order, impedance of the reset output of the watchdog timer becomes high.

Therefore, when the microcomputer runs away even once, it is impossible to return the microcomputer to the state of normal operation, and the windowpane is pulled up and down only by the backup operation of the backup device, that is, the windowpane is pulled up and down only by the manual operation.

In a control system in which electric power supply to the power window unit is stopped when an ignition key is turned off, it is possible to return the microcomputer to the state of normal operation by turning on and off the ignition key. However, in a control system in which electric power is directly supplied from the battery, it is impossible to reset the microcomputer unless the battery is disconnected from the system.

Accordingly, when consideration is given to the practicality after the power window device has been incorporated into an actual automobile, it is desired that the fail-safe control, which corresponds to both the stoppage of operation caused by a temporary runaway of the microcomputer and the stoppage of operation caused by submergence, is performed by judging whether the power window device is in the stoppage of operation caused by a temporary runaway of the microcomputer or the stoppage of operation caused by submergence. That is, when the microcomputer is submerged and its operation is completely stopped, it is necessary that the motor drive which is a power source of opening and closing the windowpane is not stopped, but it is necessary that the motor drive control is conducted according to a state in which the switch of opening and closing the windowpane of each door of the automobile body is turned on so that the windowpane can be pulled up (closed) or the motor drive control is conducted according to a state in which the switch of opening and closing the windowpane of each door of the automobile body is turned on so that the windowpane can be pulled down (opened).

Accordingly, it is an object of the present invention to provide a backup method of a microcomputer used in the case of stoppage of operation. A backup unit of the microcomputer, and a control unit for controlling a power window for automobile use capable of conducting the most appropriate backup on an object to be controlled by the microcomputer in both cases of the stoppage of operation caused by a temporary runaway of the microcomputer and the stoppage of operation caused by submergence.

SUMMARY OF THE INVENTION

In order to accomplish the above object, the invention described in claim 1 provides a backup method of a microcomputer used in the case of stoppage of operation including the step of operating a backup means for conducting control to be conducted by the microcomputer when a pulse signal outputted from the microcomputer is stopped for a period of time exceeding a predetermined period of time.

According to the present invention, when operation of the microcomputer is completely stopped because the microcomputer is covered with water or the microcomputer is out of order, the backup means is operated at the point of time when operation of the microcomputer is completely stopped. Due to the foregoing, even if operation of the microcomputer is completely stopped in the middle of controlling an object to be controlled (for example, in the middle of controlling the motor which is a power source of opening and closing the windowpane), in exchange for the microcomputer, the backup means conducts controlling on the object to be controlled in exchange for the microcomputer. Therefore, even when operation of the microcomputer is completely stopped because the microcomputer is covered with water or the microcomputer is out of order, the object to be controlled by the microcomputer can be normally controlled.

The invention provides a backup method of a microcomputer used in the case of stoppage of operation in which the microcomputer is periodically reset when a frequency of a pulse signal outputted from the microcomputer becomes out of a predetermined range, the backup method including the step of operating a backup means for conducting control to be conducted by the microcomputer when the pulse signal outputted from the microcomputer is stopped for a period of time exceeding a predetermined period of time.

According to the present invention, when the microcomputer temporarily runs away in the middle of controlling an object to be controlled by the microcomputer, the microcomputer is reset. When operation of the microcomputer is completely stopped because the microcomputer is covered with water or the microcomputer is out of order, the backup means is operated at the point of time when the microcomputer is stopped.

Accordingly, the most appropriate backup can be conducted on the object to be controlled by the microcomputer in both the case in which operation of the microcomputer is stopped because the microcomputer temporarily runs away and the case in which operation of the microcomputer is completely stopped because the microcomputer is covered with water or the microcomputer is out of order.

The predetermined period of time is longer than a period of time from a temporary runaway of the microcomputer to a return to the normal state of the microcomputer.

The invention provides a backup unit of a microcomputer including: a backup means for conducting control to be conducted by the microcomputer in exchange for the microcomputer; an external microcomputer monitoring means, arranged outside the microcomputer, capable of conducting an enable/disable setting from the outside of the microcomputer, for monitoring a frequency of a pulse signal outputted from the microcomputer and resetting the microcomputer periodically when the frequency of the pulse signal becomes out of a predetermined frequency range; and an internal microcomputer monitoring means, incorporated into the microcomputer body as a program, for monitoring a pulse signal outputted from the microcomputer, for outputting a signal to disable the external monitoring means when the pulse signal is not outputted exceeding a predetermined period of time, and for making the backup means continue the operation while the external microcomputer monitoring means is being disabled.

According to the present invention, an external microcomputer monitoring means monitors a pulse signal outputted from the microcomputer and periodically conducts resetting on the microcomputer when the frequency of the pulse signal becomes out of a predetermined frequency range. The internal microcomputer monitoring means, incorporated into the microcomputer body, for monitoring a pulse signal outputted from the microcomputer, outputs a signal to disable the external monitoring means when the pulse signal is not outputted exceeding a predetermined period of time. The internal microcomputer monitoring means makes the backup means continue the operation while the external microcomputer monitoring means is being disabled. Due to the foregoing, for example, when operation of the microcomputer is completely stopped in the middle of controlling an object to be controlled by the microcomputer, the backup means controls the object to be controlled in exchange for the microcomputer. Therefore, even when operation of the microcomputer is completely stopped because it is covered with water or it is out of order, the object to be controlled by the microcomputer can be normally controlled.

Accordingly, the most appropriate backup can be conducted on the object to be controlled by the microcomputer in both the case in which operation of the microcomputer is stopped because the microcomputer temporarily runs away and the case in which operation of the microcomputer is completely stopped because the microcomputer is covered with water or the microcomputer is out of order.

The invention provides a power window control unit for automobile use including: a microcomputer for pulling up or down a windowpane according to the state of operation of an operation switch, the microcomputer outputting a pulse signal outside simultaneously with the start of operation; a backup means for conducting control to be conducted by the microcomputer in exchange for the microcomputer; an external microcomputer monitoring means, arranged outside the microcomputer, capable of conducting an enable/disable setting from the outside of the microcomputer, for monitoring a frequency of a pulse signal outputted from the microcomputer and resetting the microcomputer periodically when the frequency of the pulse signal becomes out of a predetermined frequency range; and an internal microcomputer monitoring means, incorporated into the microcomputer body as a program, for monitoring a pulse signal outputted from the microcomputer, for outputting a signal to disable the external monitoring means when the pulse signal is not outputted exceeding a predetermined period of time, and for making the backup means continue the operation while the external microcomputer monitoring means is being disabled.

According to the present invention, the external microcomputer monitoring means monitors a frequency of a pulse signal outputted from the microcomputer and resetting the microcomputer periodically when the frequency of the pulse signal becomes out of a predetermined frequency range. The internal microcomputer monitoring means, incorporated into the microcomputer body, for monitoring a pulse signal outputted from the microcomputer, outputs a signal to disable the external monitoring means when the pulse signal is not outputted exceeding a predetermined period of time. The internal microcomputer monitoring means makes the backup means continue the operation while the external microcomputer monitoring means is being disabled. Due to the foregoing, for example, when operation of the microcomputer is completely stopped in the middle of controlling an object to be controlled by the microcomputer, the backup means controls the object to be controlled in exchange for the microcomputer. Therefore, even when operation of the microcomputer is completely stopped because it is covered with water or it is out of order, the object to be controlled by the microcomputer can be normally controlled.

Accordingly, the most appropriate backup can be conducted on the object to be controlled by the microcomputer in both the case in which operation of the microcomputer is stopped because the microcomputer temporarily runs away and the case in which operation of the microcomputer is completely stopped because the microcomputer is covered with water or the microcomputer is out of order.

The internal microcomputer monitoring means outputs a signal to disable the external microcomputer monitoring means when the pulse signal outputted from the microcomputer is not outputted exceeding a period of time from a temporary runaway of the microcomputer to a return of the microcomputer to the normal state.

DESCRIPTION OF PREFERRED EMBODIMENT

Referring to the appended drawings, an embodiment of the present invention will be explained below.

Figure 1:
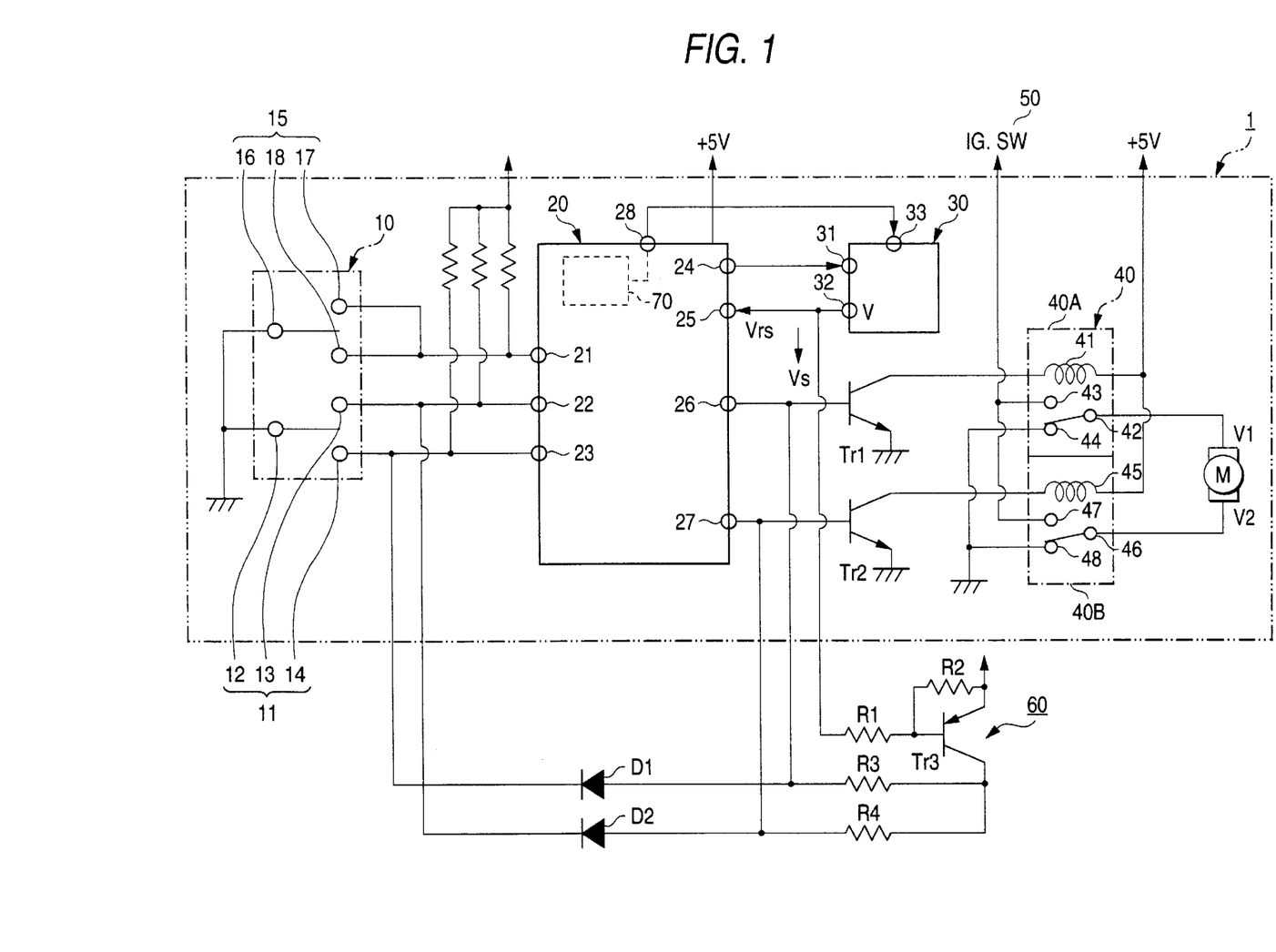
FIG. 1 is a circuit diagram showing a structure of an embodiment of the power window control unit for automobile use of the present invention.

FIG. 1 is a block diagram showing an arrangement of the power window control unit for automobile use of the present invention.

As shown in the drawing, the power window control unit 1 for automobile use of this embodiment includes a switch unit 10 composed of a manual operation switch 11 and automatic operation switch 15 used for opening and closing each windowpane of an automobile. As described before, at least the switch unit 10 for the door of the driver's seat is provided with both the manual switch 11 and the automatic switch 15.

When a driver or a fellow passenger operates the switch, DC motor M, which is a power source for opening and closing the windowpane, is turned on in the normal or the reverse direction, and torque of DC motor M is transmitted to an actuator (not shown) which is an elevating mechanism for elevating the windowpane. When the actuator is operated, the elevating mechanism for pulling up the windowpane so that the windowpane can be closed, or the elevating mechanism for pulling down the windowpane so that the windowpane can be opened.

The manual operation switch 11 is operated as follows. Only while the manual operation switch 11 is being operated, DC motor M is driven. Therefore, the manual operation switch 11 is used when the windowpane is opened or closed to an intermediate position. Alternatively, the manual operation switch 11 is used when the windowpane is fully opened or closed so that the pull-up or pull-down operation can be successively conducted. This manual operation switch 11 includes: a moving contact 12 connected to the ground and held at a neutral position at all times; and stationary contacts 13, 14 for pulling up and down the windowpane which are contacted with the moving contact 12 by manual operation so that a selective switching operation can be performed.

The automatic operation switch 15 is operated in such a manner that when this automatic operation switch 15 is once operated, operation of pulling up or down can be continued until the windowpane reaches the lower limit which is the fully opened position, or the windowpane reaches the upper limit which is the fully closed position. This automatic operation switch 15 includes: a moving contact 16 connected to the ground and held at a neutral position at all times; and stationary contacts 17, 18 for automatic operating the windowpane which are contacted with the moving contact 16 by manual operation so that a selective switching operation can be performed.

This control unit 1 includes: a microcomputer body 20 arranged between the switch unit 10 and DC motor M; a watchdog timer (referred to as an external watchdog timer) 30 which is a microcomputer monitoring means for monitoring whether the microcomputer body 20 is operated normally or abnormally; and a switch relay circuit 40, wherein these components are electrically connected with each other.

The microcomputer body 20 includes CPU, memory and I/O port and connects with a constant voltage power source of 5 V. CPU includes a control section and calculating section. Into the control section of CPU, switch signals are inputted which are sent from the input terminals 21, 22, 23 via the manual operation switch 11 or the automatic operation switch 15 of the switch unit 10. The control section includes: a pulse output terminal 24 for inputting a pulse signal into the external watchdog timer 30 and a B-signal output terminal 28 for inputting a B-signal so as to set a state (enable/disable) of the external watchdog timer 30. The control section also includes a reset terminal 25 into which a reset signal is inputted from the external watchdog timer 30 so that the reset signal can be inputted into the control section. Further, the control section includes output terminals 26, 27 for inputting control signals into the bases of relay drive transistors Tr1, Tr2 used for pulling up and down.

In CPU of the microcomputer body 20, there is provided with a watchdog timer (referred to as an internal watchdog timer) 70 which is a microcomputer monitoring means of soft ware operated independently from the control section and the calculating section. This internal watchdog timer 70 monitors a pulse signal, which is outputted from the control section of CPU of the microcomputer body 20, in the microcomputer body. While the pulse signal is being outputted, the internal watchdog timer 70 makes B-signal at a high level, so that the external watchdog timer 30 is, for example, enabled, that is, the external watchdog timer 30 is made to be in an operating state. When the pulse signal is not outputted for a period of time longer than a predetermined period of time, the level of B-signal is changed from a high level to low level, so that the external watchdog timer 30 is, for example, disabled, that is, the external watchdog timer 30 is set in a state of non-operation. In this case, the predetermined period of time is defined as a period of time exceeding a period in which the pulse signal temporarily becomes a high level or low level when the microcomputer body 20 unexpectedly runs away or a voltage supplied to the microcomputer body 10 from an electric power source is lowered.

The external watchdog timer 30 includes input terminals 31, 33 and an output terminal 32. Signals can be sent and received between the external watchdog timer 30 and the control section of the microcomputer body 20 via these terminals. In this case, the external watchdog timer 30 receives B-signal outputted from B-signal output terminal 28 of the internal watchdog timer 70 of the microcomputer body 20, and control of enable/disable is conducted according to whether the level of B-signal is high or low. In the case of enabling, the output terminal 32 is capable of outputting a reset signal, and in the case of disabling, impedance of the output terminal 32 becomes high. That is, the pulse signal is not outputted from the control section of CPU of the microcomputer body 20, and this period of time in which the pulse signal is not outputted from the control section of CPU exceeding a predetermined period of time, the external watchdog timer 30 is disabled according to the level of B-signal sent from B-signal output terminal 28 of the internal watchdog timer 70 of the microcomputer body 20, and impedance of the output terminal 32 becomes high, by the level of which the voltage level tends to be lowered by the leakage when the microcomputer is covered with water.

The external watchdog timer 30 receives a pulse signal outputted from the pulse output terminal 24 of the control section of the microcomputer body 20 and monitors the frequency of the pulse signal to check whether or not the frequency is appropriate.

In general, the watchdog timer has a function of stopping the entire system or a portion of the system under a specific condition. In this embodiment, the external watchdog timer 30 includes a control circuit composed of semiconductor IC. Therefore, the external watchdog timer 30 is capable of detecting whether or not the frequency of the output pulses outputted from the microcomputer body 20 is in a predetermined frequency range. According to the detection signal, the external watchdog timer 30 judges whether or not the microcomputer body 20 is operating normally or abnormally. In the case where it is judged that the microcomputer body 20 is operating abnormally, impedance of the output terminal 32 is periodically made to be high and low, and the reset signal is outputted.

In this connection, while B-signal outputted from the internal watchdog timer 70 is disabling the external watchdog timer 30, when impedance of the output terminal 32 becomes high and the microcomputer is covered with water, the voltage level tends to be lowered due to the leakage.

The switch relay circuit 40 has a switch relay 40A for pulling up and a switch relay 40B for pulling down. The switch relay 40A for pulling up includes a relay coil 41, moving contact 42 and two stationary contacts 43, 44. The switch relay 40B for pulling down includes a relay coil 45, moving contact 46 and two stationary contacts 47, 48. One end of each relay coil 41, 45 is connected with, for example, a constant voltage power source of 5 V.

The stationary contact 43 of the switch relay 40A for pulling up and the stationary contact 47 of the switch relay 40B for pulling down are connected with each other and also connected with a battery (not shown) mounted on an automobile via the ignition switch 50. Both stationary contacts 44, 48 of pulling up and down on the other side are connected with each other and grounded.

Both relay drive transistors Tr1, Tr2 are of NPN type, and their collectors are connected with the corresponding relay coils 41, 45 for pulling up and down. When control signals are inputted from the output terminals 26, 27 of the control section of the microcomputer body 20 into the bases of relay drive transistors Tr1, Tr2, they are turned on and biased. Due to the above switching action, one of the switching relays 40A, 40B for pulling up and down of the switching relay circuit 40 is operated. When one of the switching relays 40A, 40B is operated, electric power is supplied from the battery, which is a power source, to DC motor M so that DC motor can be driven. Therefore, DC motor is started in the normal or reverse direction. Due to the foregoing, the windowpane is pulled up or down.

On the other hand, the backup circuit 60 includes a transistor Tr3 of PNP type for backup. The base of this backup transistor Tr3 is connected with the output terminal 32 of the watchdog timer 30 via resistor R1. Therefore, the signal outputted from the output terminal 32 of the external watchdog timer 30 is outputted to the reset input terminal 25 of the microcomputer body 20 as a reset signal. At the same time, the signal outputted from the output terminal 32 of the external watchdog timer 30 is outputted to the base of backup transistor Tr3 as a set signal.

Bias resistor R2 is connected between the base and the emitter of this backup transistor Tr3. The collector of backup transistor Tr3 is connected with the two stationary contacts 13, 14 for pulling up and down of the manual operation switch 11 via diodes D1, D2. The reason why diodes D1, D2 are arranged in the circuit is that they can provide a rectifying action and further they can prevent the occurrence of erroneous operation of the backup circuit 60 when a disturbance signal enters the circuit from the switch unit 10 side.

Further, the collector of backup transistor Tr3 is connected with the base of relay driving transistors Tr1, Tr2 for pulling up and down via resistor R3, R4. Due to the foregoing, the collector current of backup transistor Tr3 can be supplied to the bases of relay driving transistors Tr1, Tr2 when a bias is given.

Operation and action of the power window control unit 1 for automobile use of the present invention, the structure of which is described above, will be explained below.

(a) Operation of the microcomputer body 20

Figure 2:
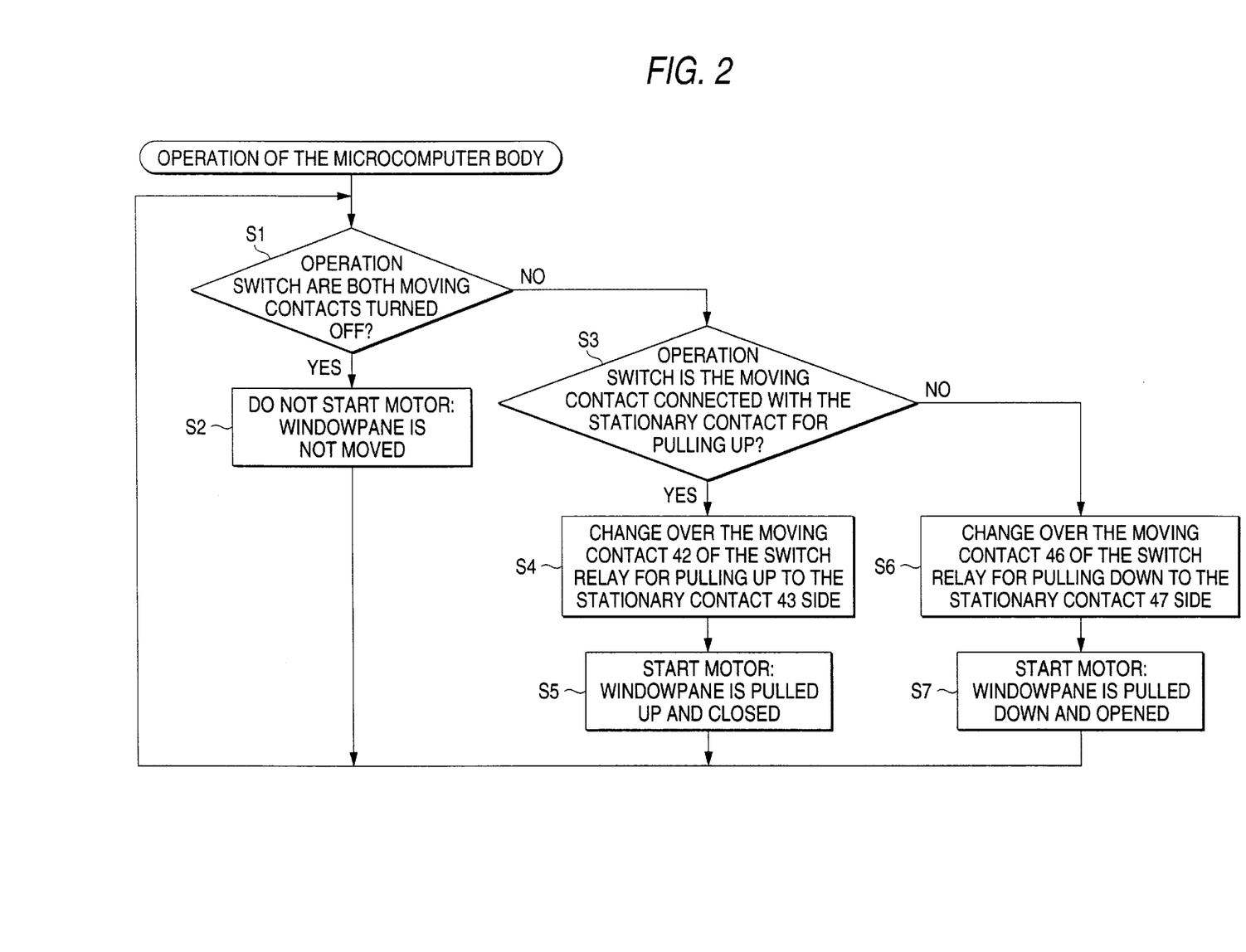
FIG. 2 is a flow chart of operation of the power window control unit for automobile use of the embodiment.

FIG. 2 is a flow chart showing the operation of the microcomputer body 20.

As a precondition, in the case of normal operation, the microcomputer body 20 outputs a pulse signal, the frequency of which is in a predetermined frequency region, from the pulse output terminal 24. This pulse signal is taken into the internal watchdog timer 70 in the microcomputer body 20 and at the same time taken into the external watchdog timer 30 via the input terminal 31.

In step S1, under the condition that the microcomputer 20 is normally operated, it is judged whether or not both the moving contact 12 of the manual operation switch 11 and the moving contact 16 of the automatic operation switch 15 are turned off. When both moving contacts 12, 16 are turned off (Yes), both the switch relays 40A, 40B for pulling up and down are turned off, that is, the moving contact 42 of the switch relay 40A for pulling up is connected with the stationary contact 44, and the moving contact 46 of the switch relay 40B for pulling down is connected with the stationary contact 48. Therefore, both electric potentials V1, V2 of motor M are at a low level, and motor M is not started. Accordingly, the windowpane is not moved at all (step S2).

On the other hand, when one of the moving contacts 12, 16 is turned on in step S1 (No), the program proceeds to step S3. In this step S3, it is judged whether or not the moving contact 12 is connected with either of the stationary contacts 13, 14 for pulling up and down, and also it is judged whether or not the moving contact 16 is connected with either of the stationary contacts 17, 18 for automatic operation.

When it is judged in this judgment that the moving contact 12 of the manual operation switch 11 is connected with the stationary contact 13 for pulling up (Yes), a base bias is impressed upon relay driving transistor Tr1 for pulling up so that relay driving transistor Tr1 is turned on, and the moving contact 42 of the switch relay 40A for pulling up is changed over to the stationary contact 43 side (step S4). Due to the foregoing operation, one electrical potential V1 of motor M becomes a high level, and the other electrical potential V2 of motor M becomes a low level. Therefore, motor M is started in the direction of pulling up. As a result, the windowpane is pulled up and closed (step S5). This operation is continued while the moving contact 12 is being connected with the stationary contact 13 for pulling up, and stopped when the windowpane is completely closed.

On the other hand, when it is judged in this judgment that the moving contact 12 of the manual operation switch 11 is connected with the stationary contact 14 for pulling down (No), a base bias is impressed upon relay driving transistor Tr2 for pulling down so that relay driving transistor Tr2 is turned on, and the moving contact 46 of the switch relay 40B for pulling down is changed over to the stationary contact 47 side (step S6). Due to the foregoing operation, one electrical potential V2 of motor M becomes a high level, and the other electrical potential V1 of motor M becomes a low level. Therefore, motor M is started in the direction of pulling down. As a result, the windowpane is pulled down and opened (step S7). This operation is continued while the moving contact 12 is being connected with the stationary contact 14 for pulling down, and stopped when the windowpane is completely opened.

When it is judged that the moving contact 16 of the automatic operation switch 15 is connected with the stationary contact 17 for automatic. operation and the moving contact 12 of the manual operation switch 11 is connected with the stationary contact 13 for pulling up (Yes), relay driving transistor Tr1 for pulling. up is turned on until the windowpane is completely closed.

When it is judged that the moving contact 16 of the automatic operation switch 15 is connected with the stationary contact 18 for automatic operation and the moving contact 12 of the manual operation switch 11 is connected with the stationary contact 14 for pulling down (No), relay driving transistor Tr2 for pulling down is turned on until the windowpane is completely opened.

(b) Operation of the internal watchdog timer 70 of the microcomputer body 20.

Figure 3:
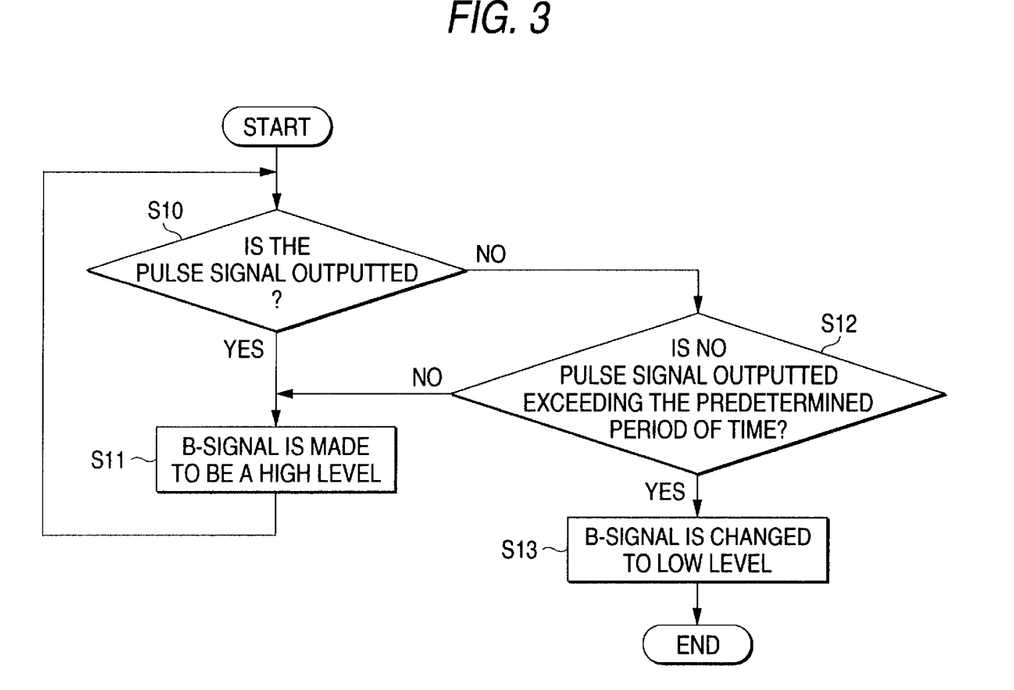
FIG. 3 is a flow chart of operation of the power window control unit for automobile use of the embodiment.

FIG. 3 is a flow chart showing the operation of the internal watchdog timer 70 of the microcomputer body 20. The internal watchdog timer 70 monitors a pulse signal outputted from the control section of CPU of the microcomputer body 20 and judges whether or not the pulse signal is outputted (step S10). When it is judged in this judgment that the pulse signal is outputted, B-signal is made to be a high level, and the external watchdog timer 30 is, for example, enabled (step S11). On the other hand, when it is judged that the pulse signal is not outputted, it is judged whether or not a period in which the pulse signal is not outputted exceeding a predetermined period (step S12). When it is judged that the period in which the pulse signal is not outputted exceeding the predetermined period of time, it is judged that the microcomputer is covered with water or out of order. Therefore, B-signal is changed from a high level to low level, and the external watchdog timer 30 is, for example, disabled (step S13). After that the processing is completed.

When it is judged in step S12 that the pulse signal is outputted again in the predetermined period of time, the program proceeds to step S11, and B-signal is made to be a high level, and the external watchdog timer 30 is, for example, enabled.

(c) Operation of the external watchdog timer 30 of the microcomputer body 20

Figure 4:
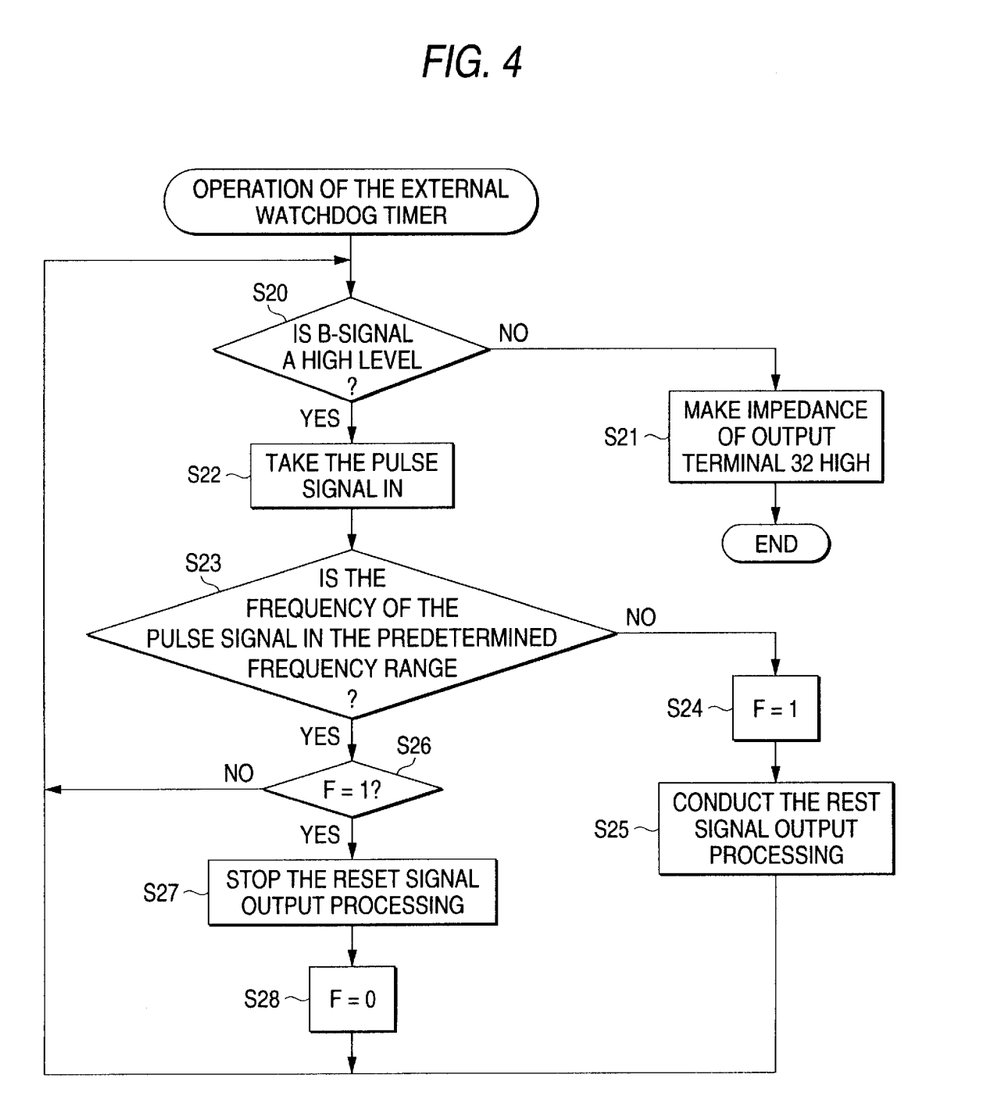
FIG. 4 is a flow chart of operation of the power window control unit for automobile use of the embodiment.

FIG. 4 is a flow chart showing the operation of the external watchdog timer 30 of the microcomputer body 20.

First, the external watchdog timer 30 judges whether or not B-signal outputted from the internal watchdog timer 70 of the microcomputer body 20 is at a high level (step S20). When it is judged that B-signal is not at a high level, it is judged that the microcomputer is covered with water or out of order. Therefore, impedance of the output terminal 32 is made high (step S21) and the processing is completed.

On the other hand, when it is judged that B-signal is at a high level, it can be judged that the microcomputer is neither covered with water nor out of order, and the pulse signal is taken in (step S22). Then it is judged whether or not the frequency is in a predetermined frequency range (step S23). When it is judged in this judgment that the frequency of the pulse signal is not in a predetermined frequency range, it can be considered that the microcomputer body 20 temporarily runs away, and flag F is set at "1" (step S24), and then the reset signal output processing is conducted (step S25). In this reset signal output processing, the reset signal is periodically outputted from the output terminal 32 to the microcomputer body 20.

On the other hand, when it is judged that the pulse signal is in the predetermined frequency range, it is judged whether or not the value of flag F is "1". When the value of flag F is not "1" in this judgment, no processing is conducted and the program returns to step S20. When the value of flag F is "1" in this judgment, the reset signal output processing is stopped (step S27). Due to the foregoing, no reset signal is outputted.

After the reset signal output processing has been stopped, the value of flag F is set at "0" (step S28), and the program returns to S20.

In step S21, when impedance of the output terminal 32 of the external watchdog timer 30 becomes high and the voltage is decreased due to the leakage caused when the microcomputer is covered with water, the base bias is impressed upon backup transistor Tr3 in the backup circuit 60. Due to the foregoing, backup transistor Tr3 is turned on, and a collector current is supplied from the collector of this backup transistor Tr3 to the bases of relay driving transistors Tr1, Tr2 at a high level. Therefore, these relay driving transistors Tr1, Tr2 are respectively turned on. As a result, both the two switch relays 40A, 40B for pulling up and down are forcibly turned on.

When the moving contact 12 of the manual operation switch 11 is connected with the stationary contact 13 for pulling up at this time or the moving contact 12 of the manual operation switch 11 has already been connected with the stationary contact 13 for pulling up, the collector current flowing from the collector of backup transistor Tr3 to relay driving transistor Tr2 for pulling down becomes a low level. Therefore, the switch relay 40B for pulling down is forcibly turned off. Due to the foregoing operation, one electrical potential V1 of motor M becomes a high level, and the other electrical potential V2 of motor M becomes a low level. Therefore, motor M is started in the direction of pulling up. As a result, the windowpane is pulled up and closed.

On the other hand, when the moving contact 12 of the manual operation switch 11 is connected with the stationary contact 14 for pulling down at this time or the moving contact 12 of the manual operation switch 11 has already been connected with the stationary contact 14 for pulling down, the collector current flowing from the collector of backup transistor Tr3 to relay driving transistor Tr1 for pulling up becomes a low level. Therefore, the switch relay 40A for pulling up is forcibly turned off. Due to the foregoing operation, one electrical potential V2 of motor M becomes a high level, and the other electrical potential V1 of motor M becomes a low level. Therefore, motor M is started in the direction of pulling down. As a result, the windowpane is pulled down and opened. As described above, the pulse signal outputted from the microcomputer body 20 is monitored by the external watchdog timer 30, and when the frequency of the pulse signal outputted from the microcomputer body 20 temporarily fluctuates from a predetermined frequency range, it is judged that the microcomputer body 20 temporarily runs away, and "a reset signal" is outputted from the output terminal 32 of the external watchdog timer 30 so that the microcomputer body 20 is reset.

The pulse signal outputted from the microcomputer body 20 is monitored by the internal watchdog timer 70 which is incorporated into the microcomputer body 20 as a program. When the pulse signal is not outputted exceeding a predetermined period of time, it is judged that the operation of the microcomputer body 20 is completely stopped because the microcomputer body 20 is covered with water or out of order. Therefore, the external watchdog timer 30 is disabled, and impedance of the output terminal 32 is made high. Due to the foregoing, backup transistor Tr3 in the backup circuit 60 is turned on by the leakage caused when the microcomputer body 20 is covered with water, and the windowpane can be effectively opened and closed by the switch unit 10. That is, while impedance of the output terminal 32 of the external watchdog timer 30 is kept high, the backup circuit 60 is successively operated. Therefore, the windowpane can be manually opened and closed by the manual operation switch 11 during the period of time.

Accordingly, when the microcomputer temporarily runs away and the operation is stopped and also when the operation of the microcomputer is completely stopped by a failure of the microcomputer, the most appropriate backup can be conducted on the object to be controlled by the microcomputer.

In this embodiment, an object to be controlled is backed up even when the microcomputer body 20 of the power window control unit for automobile use runs away. However, it should be noted that the embodiment is not limited to the power window control unit for automobile use, but the embodiment can be applied to any device as long as the microcomputer is incorporated into the device.

As explained above, according to the invention, when the operation of the microcomputer is completely stopped by submergence or failure, the backup means can be operated at the point of time when the operation has stopped. Therefore, even when the operation of the microcomputer is completely stopped by submergence or failure, an object to be controlled by the microcomputer can be normally operated.

When the microcomputer temporarily runs away in the middle of controlling an object to be controlled, the microcomputer is reset. When the operation of the microcomputer is completely stopped by submergence or failure of the microcomputer, the backup means is operated at the point of time of stoppage of the operation. Therefore, in the case of stoppage of the operation caused when the microcomputer temporarily runs away and also in the case of complete stoppage of the operation caused by submergence or failure of the microcomputer, the most appropriate backup can be conducted on an object to be controlled by the microcomputer.

An external microcomputer monitoring means monitors a pulse signal outputted from the microcomputer and periodically conducts resetting on the microcomputer when the frequency of the pulse signal becomes out of a predetermined frequency range. The internal microcomputer monitoring means, incorporated into the microcomputer body, for monitoring a pulse signal outputted from the microcomputer, outputs a signal to disable the external monitoring means when the pulse signal is not outputted exceeding a predetermined period of time. The internal microcomputer monitoring means makes the backup means continue the operation while the external microcomputer monitoring means is being disabled. Accordingly, the most appropriate backup can be conducted on the object to be controlled by the microcomputer in both the case in which operation of the microcomputer is stopped because the microcomputer temporarily runs away and the case in which operation of the microcomputer is completely stopped because the microcomputer is covered with water or out of order.

The external microcomputer monitoring device monitors a frequency of a pulse signal outputted from the microcomputer and resets the microcomputer periodically when the frequency of the pulse signal becomes out of a predetermined range of a predetermined frequency range. The internal microcomputer monitoring device incorporated into the microcomputer body, for monitoring a pulse signal outputted from the microcomputer, outputs a signal to disable the external monitoring device when the pulse signal is not outputted exceeding a predetermined time. The internal microcomputer monitoring device makes the backup device continues the operation while the external microcomputer monitoring device is being disabled. Accordingly, the most appropriate backup can be conducted on the object to be controlled by the microcomputer in both the case in which operation of the microcomputer is stopped because the microcomputer temporarily runs away and the case in which operation of the microcomputer is completely stopped because the microcomputer is covered with water or is out of order. As a result, it is possible to provide a highly reliable power window control unit for automobile use.

What is claimed is:

1. A backup method of a microcomputer used in the case of stoppage of operation comprising: operating a backup system conducting control to be conducted by the microcomputer when a pulse signal outputted from the microcomputer is stopped for a period of time exceeding a predetermined period of time; and setting an output impedance of a monitor circuit to an increased level when the pulse signal is stopped for the period exceeding the predetermined period of time, and operating the backup system conducting control in response to the increased level output impedance.

2. A backup method according to claim 1, wherein said predetermined period of time is longer than a period of time from a temporary runaway of the microcomputer to a return to the normal state of the microcomputer.

3. A backup method of a microcomputer used in the case of stoppage of operation in which the microcomputer is periodically reset when a frequency of a pulse signal outputted from the microcomputer becomes out of a predetermined range, said backup method comprising: operating a backup system conducting control to be conducted by the microcomputer when the pulse signal is stopped for a period of time exceeding a predetermined period of time; and setting an output impedance of a monitor circuit to an increased level when the pulse signal is stopped for the period exceeding the predetermined period of time, and operating the backup control conducting control in response to the increased level output impedance.

4. A backup method according to claim 3, wherein said predetermined period time is longer than a period of time from a temporary runaway of the microcomputer to a return to the normal state of the microcomputer.

5. A backup unit of a microcomputer executing a predetermined operation, said microcomputer outputting a pulse signal having a predetermined frequency when said microcomputer properly functions, said backup unit comprising:

a backup system for executing said predetermined operation in place of said microcomputer;

an external microcomputer monitor, arranged outside the microcomputer, being externally controllable to be set into an enabled state and a disabled state, monitoring the frequency, and resetting the microcomputer periodically when the frequency of the pulse signal becomes out of a predetermined frequency range; and an internal microcomputer monitor incorporated into the microcomputer as a program, monitoring said pulse signal, outputting a signal to set said external microcomputer monitor into said disabled state when no pulse signal is outputted for a predetermined time period, and driving said backup system continuously to execute said predetermined operation while said disabled state is set for the external microcomputer monitor.

6. A backup unit according to claim 5, wherein said predetermined time period is longer than a period of time from a temporary runaway of the microcomputer to a return of the microcomputer to the normal state.

7. A power window control unit for automobile comprising:

a microcomputer executing an operation of pulling up or pulling down a windowpane according to a state of operation of an operation switch, and outputting a pulse signal having a predetermined frequency simultaneously with the start of operation;

a backup system for executing said operation in place of said microcomputer;

an external microcomputer monitor, arranged outside said microcomputer, being externally controllable to be set into an enabled state and a disabled state, monitoring the frequency, and resetting said microcomputer periodically when the frequency of the pulse signal becomes out of a predetermined frequency range;

an internal microcomputer monitor, incorporated into said microcomputer body as a program, monitoring said pulse signal, outputting a signal to said external microcomputer monitor into said disabled state when no pulse signal is not outputted for a predetermined time period, and driving said backup system continuously to execute said predetermined operation while said disabled state is set for said external microcomputer monitor.

8. A power window control unit according to claim 7, wherein said predetermined time period is longer than a period of time from a temporary runaway of said microcomputer to a return of said microcomputer to the normal state.

9. The backup unit of claim 5 wherein the disabled state of the external monitor comprises an increased output impedance of the external monitor, and wherein the backup system executes said predetermined operation in response to the increased output impedance.

10. The backup unit of claim 7 wherein the disabled state of the external monitor comprises an increased output impedance of the external monitor, and wherein the backup system executes said predetermined operation in response to the increased output impedance.

11. The backup unit of claim 9, wherein said external monitor monitors the frequency and further receives a non-cyclic level signal from the internal microcomputer monitor for setting one of the enabled and the disabled state.

12. The backup unit of claim 10, wherein said external monitor monitors the frequency and further receives a non-cyclic level signal from the internal microcomputer monitor for setting one of the enabled and the disabled state.

13. The backup unit of claim 11, wherein backup system comprises a transistor with a base electrically connected to an output impedance terminal of the external monitor, said transistor being activated in response to the increased output impedance and having a collector connected to a device performing said predetermined operation.

14. The backup unit of claim 12, wherein said backup system comprises a transistor with a base electrically connected to the output impedance of the external monitor, said transistor being activated in response to the increased output impedance and having a collector connected to a device performing said predetermined operation.

* * * * *